United States Patent [19]

Jaffe

[11] 4,243,899
[45] Jan. 6, 1981

[54] LINEAR MOTOR WITH RING MAGNET AND NON-MAGNETIZABLE END CAPS

[75] Inventor: Wolfgang Jaffe, Roselle Park, N.J.

[73] Assignee: The Singer Company, Stamford, Conn.

[21] Appl. No.: 18,553

[22] Filed: Mar. 8, 1979

[51] Int. Cl.³ ............................................. H02K 41/00
[52] U.S. Cl. .................................... 310/14; 335/229
[58] Field of Search .................... 335/229, 230; 310/12–19, 30

[56] References Cited

U.S. PATENT DOCUMENTS 3,241,006  3/1966  Boyko ................................ 310/14 L
3,740,594  6/1973  Casey ................................ 310/30

*Primary Examiner*—Donovan F. Duggan
*Attorney, Agent, or Firm*—William V. Ebs; Robert E. Smith; Edward L. Bell

[57] ABSTRACT

A linear motor is provided with a coil, a plunger selectively positionable thereby, a permanent magnet concentric with the coil and plunger having oppositely polarized magnetic poles on outer and inner surfaces creating a magnetic circuit extending through the plunger, end caps of non-magnetizable material in line with the plunger, and an output shaft of non-magnetizable material extending through an end cap.

6 Claims, 6 Drawing Figures

LINEAR MOTOR WITH RING MAGNET AND NON-MAGNETIZABLE END CAPS

BACKGROUND OF THE INVENTION

1. Field of the Invention

The invention relates to electrically energized linear motors or solenoids.

2. Description of the Prior Art

Bistable solenoids having an armature which can be actuated to either of two stable positions as a function of the polarity of a D.C. voltage applied to the coil of the device are well known. Such devices commonly include an armature or plunger which is latched in an actuated position by residual magnetism in a magnetic circuit after the coil is deenergized, and considerable electrical energy is required to move the armature or plunger from its latched position. Because of the residual magnetism in bistable solenoid constructions affecting the armature, such constructions are not suitable for positioning devices wherein the armature must be selectively positionable within a defined range of operation.

A linear motor with a movable coil, which serves to selectively position an output member in response to an input control signal, is disclosed in U.S. Pat. No. 3,984,745 of The Singer Company. However, it is a disadvantage of this type of construction that movable wire leads are required for the coil. Furthermore, movable coils are difficult to properly construct for their intended purpose.

SUMMARY OF THE INVENTION

In accordance with the invention, a linear motor is provided with an casing of ferromagnetic material, a coil, a plunger of a ferromagnetic material within the coil and selectively positionable thereby, a permanent magnet in the casing concentric with the coil and plunger and having oppositely polarized magnetic poles on outer and inner surfaces, fixed end caps of non-magnetizable material in line with opposite ends of the plunger, and an output shaft of non-magnetizable material attached to the plunger and extending from the plunger to and through an end cap.

DESCRIPTION OF THE INVENTION

Figure 1:
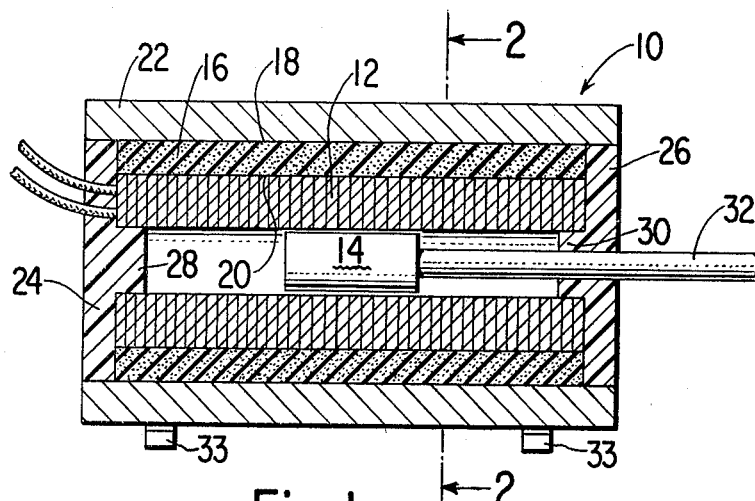
FIG. 1 is a longitudinal sectional view of a linear motor according to the invention.
Figure 2:
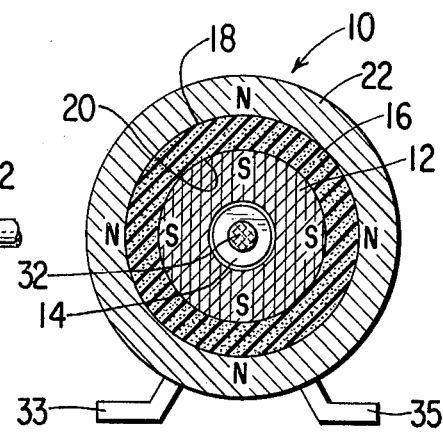
FIG. 2 is a cross-sectional view taken on the plane of the line 2—2 of FIG. 1.

Referring to FIGS. 1 and 2 of the drawings, reference character 10 designates a linear motor according to the invention including an electrical coil 12, and a plunger 14 of a ferromagnetic material located within the coil and controlled thereby. The motor additionally includes a permanent ring magnet 16 which surrounds the coil and is polarized magnetically in one sense on the outer surface 18, and in the opposite sense on the inner surface 20. By way of example, outer surface 18 and inner surface 20 are shown in FIG. 2 with north and south poles respectively which are to be understood as extending therearound. A ferromagnetic casing 22 surrounds the permanent magnet, and caps 24 and 26 of plastic or other non-magnetizable material, force fitted into the casing, seal opposite ends of the motor. The caps 24 and 26 include portions 28 and 30 which project into the coil 12 and are in line with plunger 14. An output shaft 32, which may for example be of brass, or aluminum or other non-magnetizable material, is attached to the plunger 14 and extends through end cap 26 as shown. Feet 33 and 35 provided on the casing 22 afford a convenient means for attaching the motor to a fixed support.

Permanent magnet 16 creates a magnetic field which extends through the casing 22 and plunger 14, and exerts a force tending to move the plunger longitudinally in one direction or the other whenever the plunger is in other than a metastable position, as the FIG. 1 position of plunger 14, where longitudinally acting forces due to the permanent magnet are in balance. However, the permanent magnet is selected and positioned in the linear motor relative to the casing and plunger so that the net longitudinal force due to the magnet alone acting on plunger 14 increases only slightly as the plunger is displaced from the balanced position. Such net force is so limited to a magnitude which is preferably not substantially greater than the force required to just move the plunger regardless of its position in the motor.

When a voltage is applied to coil 12, a magnetic field results which is effective to move the plunger 14 and shaft 32 in one direction or the other depending upon the polarity of the applied voltage. The position of the plunger and shaft can be readily controlled by including the motor in a servo loop wherein a position sensor generates a feedback signal representing the actual position of the plunger and such feedback signal is combined with a signal representing a desired position of the plunger to produce an error signal which is fed to the coil. Since the end caps 24 and 26, as well as shaft 32, are formed of non-magnetizable material, they do not serve as preferred paths for flux produced by the permanent magnet, nor as a sink for residual magnetism when the coil is deenergized, and do not exert a biasing affect on the plunger. Consequently, only small amounts of electrical energy are required to move the plunger 14 from one position to another in the motor.

Figure 3:
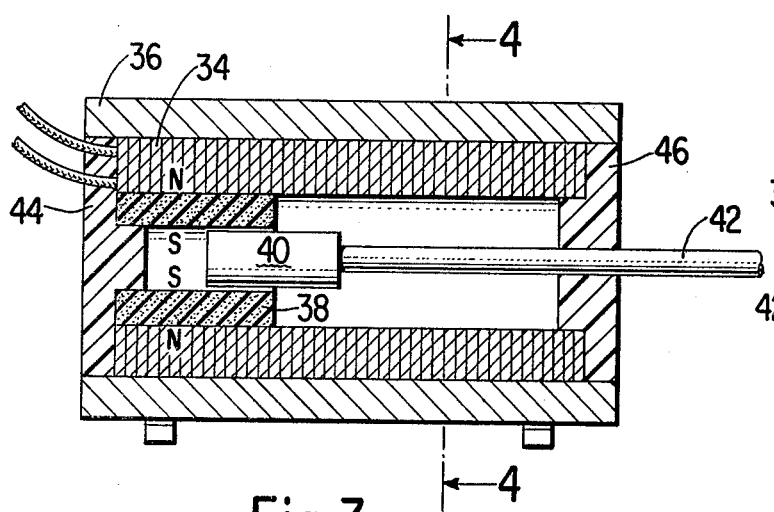
FIG. 3 is a longitudinal sectional of a linear motor according to a modified form of the invention.
Figure 4:
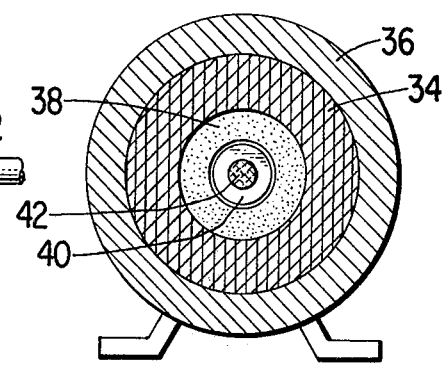
FIG. 4 is a cross-sectional view taken on the plane of the line 4—4 of FIG. 3.

In a modified construction of the motor, as shown in FIGS. 3 and 4, an electrical coil 34 is provided between an outer casing 36 of ferromagnetic material and an inner permanent ring magnet 38 having outer and inner surfaces which are oppositely polarized magnetically. A plunger 40 formed of a ferromagnetic material and having a shaft 42 of a non-ferromagnetic material attached thereto, is longitudinally movable within the permanent magnet. End caps 44 and 46 of a non-magnetizable material seal opposite ends of the motor, and the shaft 42 extends through the one end cap 46. Magnet 38 extends from end cap 44 only part way toward the other end cap 46, and so exposes a portion of the plunger to the coil 34 to enable flux, which would otherwise be concentrated in the permanent magnet when the coil is energized, to be produced in the plunger and cause the plunger to be moved in one direction or the other according to the polarity of a voltage applied to the coil. The normal range of operation of the plunger 40 is preferably controlled by a servo loop to provide for positioning the left end of the plunger, as viewed in FIG. 3, between end cap 44 and the right-hand end of permanent magnet 38.

Figure 5:
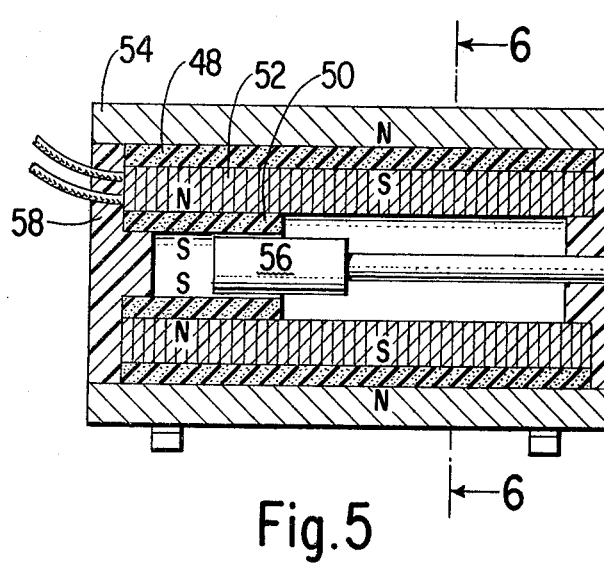
FIG. 5 is a longitudinal sectional view of a linear motor according to another modified form of the invention.
Figure 6:
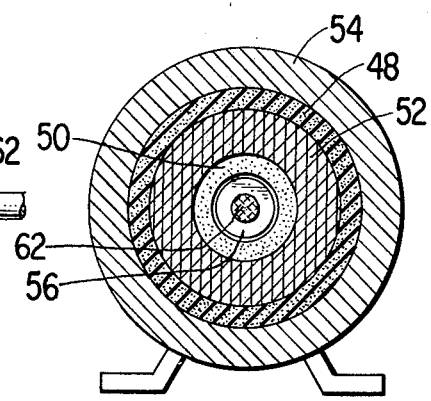
FIG. 6 is a cross-sectional view taken on the plane of the line 6—6 of FIG. 5.

FIGS. 5 and 6, show a modified form of linear motor according to the invention including two permanent magnets 48 and 50 with oppositely polarized magnetic poles on outer and inner surfaces, an electrical coil 52 between the magnets, an outer casing 54 of a ferromagnetic material, a plunger 56 of a ferromagnetic material within the magnet 50 which extends part way from one end cap 58 of non-magnetizable material toward the other end cap 60 of non-magnetizable material, and an output shaft 62 of non-magnetizable material which is attached to the plunger and extends through end cap 60. Because of the interaction of the two magnets and resulting magnetic circuit when coil 52 is energized, the linear motor of FIGS. 5 and 6, exhibits a markedly improved sensitivity as compared to the constructions of FIGS. 1 through 4.

While only particular preferred embodiments of the invention have been shown and described by way of illustration, many modifications will occur to those skilled in the art, and it is therefor to be understood that it is intended herein, to cover all such modifications as fall within the true spirit and scope of the invention.

I claim:

1. A linear motor comprising a casing of ferromagnetic material, a coil within said casing, a plunger which is wholly in a passageway in the coil and which is movable by the coil in opposite directions to selected positions in the passageway, a permanent magnet in the casing concentric with the coil and plunger, and having oppositely polarized magnetic poles on outer and inner surfaces, fixed end caps of non-magnetizable material which seal ends of the longitudinal passagway wherein the plunger is wholly located and provide an in-line face to face relationship between the ends of the plungers and the end caps extending from the plunger in the directions of movement thereof by the coil only to the non-magnetizable material of the end caps; and an output shaft of non-magnetizable material attached to the plunger and extending from the plunger to and through an end cap.

2. A linear motor as defined in claim 1 wherein the permanent magnet is located outside the coil.

3. A linear motor as defined in claim 1 wherein the permanent magnet is located inside the coil.

4. A linear motor as defined in claim 3 wherein the coil extends longitudinally in the casing beyond the permanent magnet.

5. A linear motor as defined in claim 1 wherein the said permanent magnet is located outside the coil, and a second permanent magnet is provided inside the coil, the second permanent magnet having oppositely polarized magnetic poles on outer and inner surfaces.

6. A linear motor as defined in claim 5 wherein the coil extends longitudinally in the casing beyond said second permanent magnet.

* * * * *